(12) United States Patent
McLeod et al.

(10) Patent No.: US 6,984,698 B2
(45) Date of Patent: Jan. 10, 2006

(54) POLYETHYLENE FILMS FOR BARRIER APPLICATIONS

(75) Inventors: Michael A. McLeod, Seabrook, TX (US); Gerhard K. Guenther, Seabrook, TX (US)

(73) Assignee: Fina Technology, Inc., Houston, TX (US)

( * ) Notice: Subject to any disclaimer, the term of this patent is extended or adjusted under 35 U.S.C. 154(b) by 107 days.

(21) Appl. No.: 10/685,853

(22) Filed: Oct. 15, 2003

(65) Prior Publication Data

US 2004/0082722 A1 Apr. 29, 2004

Related U.S. Application Data

(60) Continuation-in-part of application No. 10/170,753, filed on Jun. 13, 2002, now Pat. No. 6,706,822, which is a division of application No. 09/775,396, filed on Jan. 31, 2001, now Pat. No. 6,433,103.

(51) Int. Cl.
*C08F 8/00* (2006.01)
(52) U.S. Cl. .................. 525/333.8; 525/383; 525/387; 526/252
(58) Field of Classification Search ............... 525/383, 525/333.8, 387; 526/352
See application file for complete search history.

(56) References Cited

U.S. PATENT DOCUMENTS

| | | | |
|---|---|---|---|
| 5,486,575 A | | 1/1996 | Shroff ..................... 525/333.8 |
| 5,491,011 A | | 2/1996 | Pezzoli et al. ............. 428/36.7 |
| 5,530,072 A | | 6/1996 | Shirodkar ................ 525/333.8 |
| 5,728,335 A | * | 3/1998 | Neubauer ..................... 264/83 |
| 5,891,555 A | | 4/1999 | O'Brien ...................... 428/213 |
| 5,962,598 A | | 10/1999 | Mack et al. ............. 525/333.8 |
| 6,114,486 A | * | 9/2000 | Rowland et al. ............ 526/352 |
| 6,433,103 B1 | | 8/2002 | Guenther et al. ........ 525/333.8 |

FOREIGN PATENT DOCUMENTS

EP 1283224 A1 12/2003

OTHER PUBLICATIONS

James V. Krohn et al.; *Optimizing Barrier Performance of Multi-Layer Polyethylene Films*, pp. 1-9, 6 figs.

James V. Krohn et al.; *Factors Affecting the Permeability of PE Blown films*, pp. 1-6, 7 Figs, (Reprinted from Plastics—Saving Planet Earth, Proceedings of the SPE 55th Annual Technical Conference and Exhibits, Antec '97, pp. 1654-1658).

Vasanth R. Kamath et al.; *Polyethylene Melt Flow Modification*, RETEC Conference, Oct. 17-18, 1990, pp. 1-7, 8 Tables.

K. Kircher; *Crosslinking of plastics after extrusion*, pp. 489-497, 2 Tables.

* cited by examiner

*Primary Examiner*—Ling-Sui Choi
(74) *Attorney, Agent, or Firm*—Tenley R. Krueger

(57) ABSTRACT

Disclosed is a method of modifying polyethylene to increase its ability to resist the transmission of water vapor. The polyethylene is modified to increase long chain branching resulting in lower water vapor transmission rates in films prepared with the modified polyethylene. The polyethylene can be modified using peroxides, air and even by admixture with high long chain branching content polyethylene. The polyethylene, particularly when in the form of films, can be used for preparing packaging where sorption of flavor, aroma, or colorant compounds must be minimized.

16 Claims, No Drawings

POLYETHYLENE FILMS FOR BARRIER APPLICATIONS

CROSS-REFERENCE TO RELATED APPLICATIONS

This application is a continuation in part of U.S. patent application Ser. No. 10/170,753, filed Jun. 13, 2002 now U.S. Pat. No. 6,706,822, which is a divisional of U.S. patent application Ser. No. 09/775,396, filed Jan. 31, 2001, now issued as U.S. Pat. No. 6,433,103 B1, each assigned to the assignee of this application.

BACKGROUND OF THE INVENTION

1. Field of the Invention

The present invention relates to polyethylene films. The present invention particularly relates to polyethylene films useful in barrier applications.

2. Background of the Art

It is known to use polymer films in packaging applications to act as barriers for stopping or mitigating permeation of water vapor, oxygen, odors, and the like. Such polymers are, for the purposes of the present invention, barrier films, and such applications are, for the purposes of the present invention, barrier applications. For example, it is known that a recyclable multilayer ethylene polymer sheet structure for constructing a package to hold bulk products such as dry pet food having an odoriferous component, the sheet having, from the inner surface contacting the product, to the outer non-product contacting surface the structure: LLDPE/HDPE/LLDPE/BR/LDPE where LLDPE is a linear low density polyethylene, HDPE is a high density polyethylene and BR is an odor barrier resin such as ethylene vinyl alcohol copolymer having odor barrier properties and LDPE is low density polyethylene.

Another example of a barrier application is known in the art. Therein, readily castable high density polyethylene (HDPE) films, preferably containing broad molecular weight distribution HDPE resin having treated upper skin layers and untreated lower skin layers, preferably coextruded, on each side are disclosed. The treated upper skin layer is derived from a polymer, e.g., ethylene-propylene-butene-1 terpolymer, and the lower skin layer is derived from a polymer such as ethylene-propylene-butene-1 terpolymer and LDPE compounded with silicone oil. Such skin layers provide a film which is readily castable while maintaining the desirable properties of HDPE including dead fold, twist retention, TD tear and moisture barrier.

Not all barrier applications use multiple polymers. All polyethylene multilayer films are also known. For example, J. Krohn, W. Todd & J. Culter, OPTIMIZING BARRIER PERFORMANCE OF MULTILAYER POLYETHYLENE FILMS, (2001) published on the Internet at: http://www.equistarchem.com/TechLit/Brochures/Barrier%20Performance%20Multi-Layer%20Film%209366.pdf; discloses an all polyethylene multilayer film having barrier properties.

Also known in the art is improving certain properties of chromium produced polyethylene blow molding resins through the addition of organic peroxides. The improvements were directed towards increasing the stress crack resistance of blow molded polyethylene bottles. It should be noted, however, that the improved results were seen in polyethylene resins having a broad molecular weight distribution, i.e. $M_w/M_n$ being greater than 10 and that these improvements relate to properties associated with blow molding rather than barrier films.

Polyethylene resins produced with Ziegler-Natta catalysts have also been modified through the use of free radical initiators, such as oxygen, to improve the polymer properties. It is known, for example, to effect the modification of polyethylene resins used in films through such means. Ziegler-Natta produced polyethylene resins used in blow molding resins are typically bimodal resins wherein a low molecular weight polymer and a high molecular weight polymer are combined to provide a broad molecular weight distribution to improve the melt properties of the resin.

SUMMARY OF THE INVENTION

In one aspect, the present invention is a polyethylene film having good barrier properties. The film is prepared by forming a modified polyethylene polymer into a film, wherein the modified polyethylene polymer is prepared by treating a polyethylene polymer having a 2.16 melt index of from about 0.10 to about 7.0 and a polydispersity of from about 3 to about 7 to increase long chain branching by an amount sufficient to decrease the rate at which water vapor passes through a film of the modified polyethylene polymer as compared to a similar film of the unmodified polyethylene polymer.

In another aspect, the present invention is a process for preparing a polyethylene film having good barrier properties. The process includes at least the steps of preparing a modified polyethylene polymer by treating a polyethylene polymer having a 2.16 melt index of from about 0.10 to about 7.0 and a polydispersity of from about 3 to about 7 to increase long chain branching by an amount sufficient to decrease the rate at which water vapor passes through a film of the modified polyethylene polymer as compared to a similar film of the unmodified polyethylene polymer, and forming a film of the modified polyethylene.

In yet another aspect, the present invention is a modified polyethylene polymer useful for preparing films having good barrier properties. The modified polyethylene is prepared by treating a polyethylene polymer having a 2.16 melt index of from about 0.10 to about 7.0 and a polydispersity of from about 3 to about 7 to increase long chain branching by an amount sufficient to decrease the rate at which water vapor passes through a film of the modified polyethylene polymer as compared to a similar film of the unmodified polyethylene polymer.

DETAILED DESCRIPTION OF INVENTION

In one embodiment, the present invention is the discovery that a polyethylene resin that has been modified by the addition of long-chain branching can have better barrier properties than the same resin without long chain branching. For purposes of the present invention, the term "barrier properties" is defined to mean the ability of a polymer to resist the passage of water vapor. A film of a first polymer having better barrier properties would allow less water vapor to pass through as compared to a film of a second polymer having poorer barrier properties under the same conditions.

The amount of long chain branching necessary to increase the barrier properties of a polyethylene polymer can vary with the physical properties of the polyethylene polymer. There is also an optimum amount of long chain branching to increase barrier properties for a polyethylene polymer. Too little or too much long chain branching can result in a polyethylene polymer that has poorer barrier properties than that having the optimum amount of long chain branching.

In the practice of the present invention, the increase in long chain branching results in increased rheological breadth of the polyethylene polymers. Generally, the rheological breadth of the polyethylene can be increased from about 10% to about 60% compared to unmodified polyethylene resin extruded under similar conditions to achieve an improvement in the barrier properties of the polyethylene. This directly bears on and results in improvements in the barrier performance of films prepared with the polyethylene so modified. Other improvements, such as improvements in the color of an extruded polyethylene film may also be observed.

Rheological breadth is a function of the relaxation time distribution of the resin, which in turn is a function of a resin's molecular architecture. The breadth parameter is experimentally determined assuming Cox-Merz rule by fitting flow curves generated using linear-viscoelastic dynamic oscillatory frequency sweep experiments with a modified Carreau-Yasuda (CY) model, $$\eta = \eta_B [1 + (\lambda \gamma)a]^{n-1/a}$$

where:
$\eta$=viscosity (Pa s);
$\gamma$=shear rate (1/s);
a=rheological breadth parameter [CY model parameter which describes the breadth of the transition region between Newtonian and power law behavior];
$\lambda$=relaxation time sec [CY model parameter which describes the location in time of the transition region];
$\eta_B$=zero shear viscosity (Pa s) [CY model parameter which defines the Newtonian plateau]; and
n=power law constant [CY model parameter which defines the final slope of the high shear rate region].

To facilitate model fitting, the power law constant (n) is held to a constant value (n=0). Experiments were carried out using a parallel plate geometry and strains within the linear viscoelastic regime over a frequency range of 0.1 to 316.2 sec (−1). Frequency sweeps were performed at three temperatures (170° C., 200° C. and 230° C.) and the data was shifted to form a master curve at 190° C. using known time-temperature superposition methods.

The polyethylene used for barrier applications may be polyethylene homopolymers or copolymers of ethylene andy $C_3$–$C_{10}$ alpha-olefin monomers. When copolymers are used, the ethylene content will typically range from about 90 to about 100 mol %, with the balance, if any, being made up of the $C_3$–$C_{10}$ alpha olefin. In one embodiment, when the polyethylene is a copolymer, the other alpha olefin is a $C_6$ alpha olefin. The present invention has particular application in increasing the rheological breadth of polyethylene resins having a narrow molecular weight distribution hereinafter referred to as MWD, which can be used in film. In one embodiment, the present invention is used in blown film applications.

Narrow MWD polyethylenes are typically used for film, sheet, fiber and injection molding applications. MWD can be described by means of the curve obtained by gel permeation chromatography, however MWD is generally described by the polydispersity index. The polydispersity index, often referred to simply as polydispersity, is defined as the ratio of the weight-average molecular weight to the number-average molecular weight ($M_w/M_n$), for a polymer as defined by standard and well known GPC or SEC methods.

In one embodiment, the present invention is polyethylene film having good barrier properties comprising a film prepared by forming a modified polyethylene polymer into a film, wherein the modified polyethylene polymer is prepared by admixing a polyethylene polymer with from about 10 to about 150 ppm of a peroxide free radical initiator and extruding. The polyethylene resins used to prepare the films of the present invention have, prior to extrusion with the free radical initiator, a polydispersity of from about 3 to about 7. After the extrusion with the free radical initiator, the polyethylene resins can experience only a marginal change in polydispersity and their polydisperisities remain in the range of about 3 to about 7.

In another embodiment, the present invention is a polyethylene film having good barrier properties comprising a film prepared by admixing the polyethylene polymer with air and extruding under extrusion conditions sufficient to increase the long chain branching of the polyethylene polymer. Such mixing can be done by any method known to be useful to one of ordinary skill in the art of preparing extruded polyethylene film. For example, in one embodiment of the present invention, a modified polyethylene polymer film is prepared by admixing air with the polymer prior to the melt zone in a blown film production line. The combination of heat and air increases the long chain branching of the polymer.

Long chain branching can also be introduced by admixing a polyethylene polymer having a 2.16 melt index of from about 0.10 to about 7.0 and a polydispersity of from about 3 to about 7 with a second polyethylene having a comparatively high long chain branching content. Any of these or any other polyethylene having high levels of long chain branching along with a high density and narrow molecular weigh distribution can be used to prepare the modified polyethylene of the present invention.

The polyethylene resins used with the present invention have a fluff melt index using 2.16 kg weight as set forth in ASTM D1238, commonly referred to as MI2 or MI2.16, of from about 0.1 to about 7 dg/10 minutes prior to extrusion. For purposes of the present invention, all measurements of MI2.16 are in dg/10 minutes unless stated otherwise. In some embodiments, the polyethylene resins have an MI-2.16 of from about 0.3 to about 5 and, in other embodiments, from about 0.7 to about 3.0. After extrusion, the polyethylene resins used with the present invention have an MI-2.16 of from about 0.05 to about 5. In some embodiment, after extrusion, the polyethylene resins used with the present invention have an MI-2.16 of from about 0.5 to about 3.

The polyethylene useful with the present invention can be that produced using Ziegler-Natta catalysis, but can also be produced using any catalyst known to be useful by those of ordinary skill in the art of producing polyethylene. For example, the polyethylenes useful with the present invention can also be prepared using chromium catalysts. The chromium catalysts that are used are those that are well known to those skilled in the art. Activated chromium catalysts on a silica or titanium oxide support are particularly well suited to the polymerization of ethylene for blow molding resins. Metallocene or late-transition metal catalysts can be used to prepare the polyethylene useful with the present invention as well.

In one embodiment of the method of the invention, a free radical initiator is added to the polyethylene resin prior to extrusion. The free radical initiator, as used herein, is that which results in light crosslinking or branching of the polyethylene molecules. Such free radical initiators include peroxides, oxygen, air and azides. Radiation may also be used as the free radical initiator. In one embodiment of the present invention, the free radical initiators, however, are peroxides, and particularly the organic peroxides. Two classes of organic peroxides have been found to be particularly suitable. These are the dialkyl and peroxyketal type peroxides. An example of a commercially available dialkyl peroxide for use as a free radical initiator is 2,5-dimethyl-2,5-di(t-butylperoxy)hexane, available as LUPERSOL 101, from ATOFINA Chemicals, Inc. Two commercially available peroxyketal peroxides are LUPERSOL 233 and 533, which are examples of t-butyl and t-amyl type peroxides, respectively, and are also available from ATOFINA Chemicals, Inc.

The choice of peroxide may vary, however, depending upon the particular application and extruder temperatures encountered. Typical extruder temperatures are from about 350° F. (177° C.) to about 550° F. (288° C.). It is important that the extruder temperature or polyethylene melt be above the decomposition temperature of the peroxide. Thus, extruder temperatures will typically be at least 5% or higher than the decomposition temperature of the peroxide being used to ensure complete decomposition. The optimum extruder temperature can be determined using a combination of peroxide half-life versus temperature data and the residence time in the extruder as prescribed by the desired throughput.

The peroxide can be added to the polyethylene fluff or powder prior to introduction into the extruder. For polyethylene fluff having an MI-2.16 of 1.0 or greater, it is usually preferable to add the peroxide to the fluff prior to extrusion. In such cases, the peroxide should be thoroughly mixed or dispersed throughout the polymer before being introduced into the extruder. Alternatively, the peroxide can be injected into the polyethylene melt within the extruder. The peroxide is usually added as a liquid, although the peroxide may be added in other forms as well, such as a peroxide coated solid delivery. The peroxide may also be added or combined with the polyethylene prior to or after the polyethylene is fed into the extruder. It is preferable to add liquid peroxide to the melt phase of the polyethylene within the extruder to ensure that the peroxide is completely dispersed. The peroxide may be introduced into the extruder through any means known to those skilled in the art, such as by means of a gear pump or other delivery device. If oxygen or air is used as the initiator, these are preferably injected into the extruder within the polyethylene melt.

The amount of peroxide or initiator necessary to achieve the desired properties and processability may vary. The amount of peroxide or initiator is important, however, in that too little will not achieve the desired effect, while too much may result in undesirable products being produced. Typically, for peroxides, the amounts used are from about 10 to about 200 ppm, with from about 20 to 150 ppm being more typical. In one embodiment of the present invention, the range for peroxides is that from about 30 to about 100 ppm.

While ranges of, for example peroxides, are given above, the method of the present invention can desirably be practiced by determining the optimum amount of long chain branching to achieve the desired level of barrier properties in the films of the present invention. It is particularly preferable to determine this for the first use of each polyethylene resin used with the method of the present invention. One method of doing this is to prepare films using modified polyethylene having varying levels of long chain branching, test for and then plot the water vapor transmission rates. The optimum level of long chain branching can then be interpolated. Any method useful for determining the optimum level of long chain branching known to be useful o those of ordinary skill in the art of preparing barrier films can be used with the present invention.

The films of the present invention can be prepared using additives such as plasticizers, heat stabilizers, ultraviolet absorbers, antioxidants, colorings, fillers, antistatic agents, antimicrobial agents, lubricants, blocking resistants, other resins and the like, in suitable amounts. The above-mentioned films may combined with, where necessary, an organic barrier layer composed of, for example, polyvinyl alcohol, ethylene-vinyl acetate copolymer, vinylidene chloride and the like by coating or coextrusion. Where necessary, moreover, other resin may be laminated by coextrusion, whereby other functions can be imparted.

The films of the present invention can be used, either alone or in combination with other materials, in applications for any purpose where good barrier properties are an advantage. For example the films of the present invention can be used for: food packaging, fragrance and fragrance-impregnated products packaging, i.e., detergents, photographic film packaging, medical applications, packaging agricultural products, i.e., fertilizers, insecticides, converting operations where printing solvents and other surface treatments must not migrate through the film, and packaging where sorption of flavor, aroma, or colorant compounds must be minimized. The films of the present invention can be used in any way known to be useful to those of ordinary skill in the art of using polyethylene films.

EXAMPLES

The following examples are provided to illustrate the present invention. The examples are not intended to limit the scope of the present invention and they should not be so interpreted. Amounts are in weight parts or weight percentages unless otherwise indicated.

Example 1

Resin 1: A sample of a Ziegler/Natta catalyzed high-density polyethylene having a density of 0.961, and an MI-2.16 of 1.2 dg/10 minutes, commercially available from ATOFINA under the trade designation of FINATHENE® 6410, is used to prepare a film. The HDPE is compounded using an industrial scale KOBE™ extruder. Included with the HDPE are 800 ppm of IRGANOX® 1010, 400 ppm ULTRANOX ® 627A and 600 PPM of VITON® GB. The material is kept under a nitrogen purge to minimize exposure to air and the creation of long chain branching. The resulting polymer has a rheological breadth of 0.338.

Resin 2: A sample of a Ziegler/Natta catalyzed high-density polyethylene having a density of 0.961, and an MI-2.16 of 0.94 dg/10 minutes, commercially available from ATOFINA under the trade designation of FINATHENE® 6410, is used to prepare a film. The HDPE is compounded using a LEISTRITZ™ 50 lab-scale twin-screw extruder. Included with the HDPE are 800 ppm of IRGANOX® 1010, 400 ppm ULTRANOX® 627A and 600 PPM of VITON® GB. The material is exposed to air to create long chain branching resulting in a polymer having a rheological breadth of 0.227.

Resin 3: A sample of a Ziegler/Natta catalyzed high-density polyethylene having a density of 0.961, and an MI-2.16 of 0.94 dg/10 minutes, commercially available from ATOFINA under the trade designation of FINATHENE® 6410, is used to prepare a film. The HDPE is compounded using a LEISTRITZ 50 lab-scale twin-screw extruder. Included with the HDPE are 200 ppm of IRGANOX® 1010, 100 ppm ULTRANOX® 627A and 600 PPM of VITON® GB. The material is exposed to air and less antioxidant to create more long chain branching than in Resin 2, resulting in a polymer having a rheological breadth of 0.093.

The resins are blown into 1 mil (0.25 mm) films using an industrial scale blown film line with throughput held constant. The blow up ratio was 3.0 and four neck heights were used: 0 inch (0 cm) neck, 15 inch (38.1 cm) neck, 30 inch (76.2 cm) neck, and 40 inch (101.6 cm) neck. The die pin diameter is 118 mm, so scaling this gives dimensionless neck height/die diameters of 0, 3.175, 6.35, and 8.47. The resins are tested for barrier properties using a Mocon Permatron W 3/31 and run in accordance with ASTM D3985. The lowest water vapor transmission rate is obtained with Resin #2. This resin has modest amounts of long chain branching due to the polymer being exposed to air in the compounding process. The data for each Resin is recorded in Table 1.

TABLE 1

| Material | MI2 (dg/min) | Rheological Breadth | WVTR at 0 cm neck | WVTR at 38.1 cm neck | WVTR at 76.2 cm neck | WVTR at 101.6 cm neck |
| --- | --- | --- | --- | --- | --- | --- |
| Resin 1 | 1.18 | 0.338 | 0.72 | 0.64 | 0.39 | 0.29 |
| Resin 2 | 0.94 | 0.227 | 0.52 | 0.43 | 0.31 | 0.32 |
| Resin 3 | 0.45 | 0.093 | 0.69 | 0.58 | 0.48 | 0.45 |

*(g/100 in$^2$/day)

Example 2

Resin #4: A sample of a Ziegler/Natta catalyzed high-density polyethylene having a density of 0.961, and an MI-2.16 of 1.2 dg/10 minutes, commercially available from ATOFINA under the trade designation of FINATHENE® 6410, is used to prepare a film. The HDPE is compounded using a WELEX™ compounding line. Included with the HDPE are 800 ppm of IRGANOX® 1010, 400 ppm ULTRANOX® 627A and 600 PPM of VITON® GB. The materials is kept under a nitrogen purge to minimize exposed to air and the creation of long chain branching. The resulting polymer has a rheological breadth of 0.344 and an MI-2.16 of 1.16 dg/10 minutes.

Resin 5: A sample of a Ziegler/Natta catalyzed high-density polyethylene having a density of 0.961, and an MI-2.16 of 1.15 dg/10 minutes, commercially available from ATOFINA under the trade designation of FINATHENE® 6410, is used to prepare a film. The HDPE is compounded using a LEISTRITZ™ 50 lab-scale twin-screw extruder. Included with the HDPE are 800 ppm of IRGANOX® 1010, 400 ppm ULTRANOX® 627A and 600 PPM of VITON® GB. The material is exposed to a small amount of air to create limited amounts of long chain branching resulting in a polymer having a rheological breadth of 0.324 and an MI-2.16 of 1.15 dg/10 minutes.

The resins and Resin 1 from Example 1 are used to prepare 1 mil (0.25 mm) films using an industrial scale blown film line, with throughput held constant. The blow up ratio was 3.0 and the neck height was 0". The resins are tested for barrier properties using a Mocon Permatron W 3/31 and run in accordance with ASTM D3985. The results are shown in Table 2.

Resins #1 and #4 both have similar water vapor transmission rates. By adding a small amount of long chain branching through use of a free radical initiator (in this case, air), the water vapor transmission rate is significantly reduced as shown in the case of RESIN #5.

TABLE 2

| RESIN | MI2 (dg/min) | Molecular Breadth | WVTR* |
| --- | --- | --- | --- |
| 1 | 1.18 | 0.338 | 0.60 |
| 4 | 1.16 | 0.344 | 0.57 |
| 5 | 1.15 | 0.324 | 0.47 |

*(g/100 in$^2$/day)

Example 3

Resin 6: A sample of a Ziegler/Natta catalyzed high-density polyethylene having a density of 0.961, and an MI-2.16 of 1.2 dg/10 minutes, commercially available from ATOFINA under the trade designation of FINATHENE® 6410, is used to prepare a film. The HDPE is compounded using an industrial scale KOBE™ extruder. Included with the HDPE are 800 ppm of IRGANOX® 1010, 400 ppm ULTRANOX® 627A and 600 PPM of VITON® GB. The materials is kept under a nitrogen purge to minimize exposed to air and the creation of long chain branching. The resulting polymer has a rheological breadth of 0.339.

Resin 7: A sample of a Ziegler/Natta catalyzed high-density polyethylene having a density of 0.961, and an MI-2.16 of 1.04 dg/10 minutes, commercially available from ATOFINA under the trade designation of FINATHENE® 6410, is used to prepare a film. The HDPE is compounded using a LEISTRITZ™ 50 lab-scale twin-screw extruder. Included with the HDPE are 800 ppm of IRGANOX® 1010, 400 ppm ULTRANOX® 627A, 600 PPM of VITON® GB, and 30 ppm of LUPERSOL® 101. LUPERSOL 101 is a peroxide. The material is exposed to peroxide to create long chain branching resulting in a polymer having a rheological breadth of 0.285 and an MI-2.16 of 1.04 dg/10 minutes.

The resins are used to prepare 1 mil (0.25 mm) films using an industrial scale blown film line, with throughput held constant. The blow up ratio was 3.0 and the neck height was 0". The resins are tested for barrier properties using a Mocon Permatron W 3/31 and run in accordance with ASTM D3985. The results are shown in Table 3.

By adding long chain branching through use of a peroxide free radical initiator, the water vapor transmission rate is significantly reduced as shown in Table 3.

TABLE 3

| RESIN | MI2 (dg/min) | Molecular Breadth | WVTR* |
| --- | --- | --- | --- |
| 6 | 1.20 | 0.339 | 0.67 |
| 7 | 1.04 | 0.285 | 0.51 |

*(g/100 in$^2$/day)

What is claimed is:

1. A polyethylene film having good barrier properties comprising a film prepared by forming a modified polyethylene polymer into a film, wherein the modified polyethylene polymer is prepared by treating a polyethylene polymer having an MI 2.16 of from about 0.10 to about 7.0 and a polydispersity of from 3 to 7 to increase long chain branching by an amount sufficient to decrease the rate at which water vapor passes through a film of the modified polyethylene polymer as compared to an unmodified polyethylene polymer film.

2. The polyethylene film of claim 1 wherein the modified polyethylene polymer is prepared by admixing the polyethylene polymer with from about 10 to about 150 ppm of a peroxide free radical initiator and extruding under extrusion conditions sufficient to increase the long chain branching of the polyethylene polymer.

3. The polyethylene film of claim 1 wherein the modified polyethylene polymer is prepared by admixing the polyethylene polymer with air and extruding under extrusion conditions sufficient to increase the long chain branching of the polyethylene polymer.

4. The polyethylene film of claim 1 wherein the modified polyethylene polymer is prepared by admixing the polyethylene polymer with at least one additional polyethylene polymer wherein the at least one additional polyethylene polymer has a higher level of long chain branching than the polyethylene polymer.

5. The polyethylene film of claim 1 wherein the MI 2.16 is from about 0.30 to about 5.0.

6. The polyethylene film of claim 5 wherein the MI 2.16 is from about 0.70 to about 3.0.

7. The polyethylene film of claim 1 wherein the polyethylene polymer is a Ziegler/Natta catalyzed polyethylene polymer.

8. A process for preparing a polyethylene film having good barrier properties comprising preparing a modified polyethylene polymer by treating a polyethylene polymer having an MI 2.16 of from about 0.10 to about 7.0 and a polydispersity of from 3 to 7 to increase long chain branching by an amount sufficient to decrease the rate at which water vapor passes through a film of the modified polyethylene polymer as compared to an unmodified polyethylene polymer film, and forming a film of the modified polyethylene.

9. The process of claim 8 wherein the modified polyethylene polymer is prepared by admixing the polyethylene polymer with from about 10 to about 150 ppm of a peroxide free radical initiator and extruding under extrusion conditions sufficient to increase the long chain branching of the polyethylene polymer.

10. The process of claim 8 wherein the modified polyethylene polymer is prepared by admixing the polyethylene polymer with air and extruding under extrusion conditions sufficient to increase the long chain branching of the polyethylene polymer.

11. The process of claim 8 wherein the modified polyethylene polymer is prepared by admixing the polyethylene polymer with at least one additional polyethylene polymer wherein the at least one additional polyethylene polymer has a higher level of long chain branching than the polyethylene polymer.

12. The process of claim 8 wherein the MI 2.16 is from about 0.30 to about 5.0.

13. The process of claim 12 wherein the MI 2.16 is from about 0.70 to about 3.0.

14. The process of claim 8 wherein the polyethylene polymer is a Ziegler/Natta catalyzed polyethylene polymer.

15. The process of claim 8 additionally comprising forming the film into a packaging film.

16. The process of claim 9 wherein the packaging film is selected from the group consisting of food packaging, fragrance and fragrance-impregnated products packaging, photographic film packaging, medical application packaging, and agricultural product packaging.

* * * * *